United States Patent Office 3,033,847
Patented May 8, 1962

3,033,847
CATIONIC MONOAZO DYES FOR ACRYLIC AND POLYESTER FIBERS
Mario Francesco Sartori, Wilmington, Del., assignor to E. I. du Pont de Nemours and Company, Wilmington, Del., a corporation of Delaware
No Drawing. Filed Nov. 30, 1959, Ser. No. 855,967
3 Claims. (Cl. 260—158)

This invention relates to novel water-soluble, organic compounds which are useful as dyes for acid-modified acrylic polyester fibers. By acrylic fiber or acid-modified acrylic fiber, throughout this specification and claims, I mean acrylic fiber having acid sites; for instance, the sulfonate modified acrylic fibers described in U.S.P. 2,837,500 and 2,837,501. By acid-modified polyester fiber, I mean polyethylene terephthalate fiber containing metal-sulfonate groups, as described more fully in Belgian Patent No. 549,179, granted July 14, 1957.

It is an object of this invention to provide novel cationic azo dyes useful for dyeing the aforementioned fibers, producing thereon red dyeings of outstanding brightness and good light fastness, and which are furthermore characterized by stability of the shade over a wide range of pH variations, particularly in the region from pH 3 to pH 9.5. By the latter mentioned stability I mean that the shade of the dyeing on the aforementioned fibers does not change perceptibly with change of H-ion concentration in the pH range indicated. Other objects and achievements of this invention will become apparent as the description proceeds.

Now, according to my invention, the above objects are satisfactorily achieved by a group of novel cationic azo dye compounds having the general formula

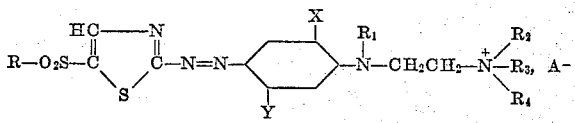

wherein R is a lower alkyl radical; X designates H, Cl or OCH₃; Y designates H, Cl, CH₃, C₂H₅ or OCH₃; R₁ stands for hydrogen, 2-hydroxyethyl, 2-cyanoethyl or lower alkyl; R₂, R₃ and R₄ designate radicals of the group consisting of lower alkyl, benzyl and 2-hydroxyethyl; and A⁻ is a water-solubilizing anion, for instance chloride, bromide, alkyl sulfate, p-toluenesulfonate, etc.

In all the discussion above and in what follows "lower alkyl" is meant to designate an alkyl radical of 1 to 4 C-atoms.

The novel compounds of this invention may be prepared by ordinary methods for instance by diazotizing the desired 5-alkylsulfonyl-2-aminothiazole, coupling in acid solution to the chosen aryliminoethyl quaternary ammonium compound, and salting out the product.

Without limiting this invention, the following examples are given to illustrate my preferred mode of operation. Parts mentioned are by weight.

Example 1

Nitrosylsulfuric acid is prepared by adding portionwise 14.5 parts (0.21 mole) of sodium nitrite, finely ground, to 100 parts of 96% sulfuric acid while stirring and keeping the temperature between 25° and 35° C. Stirring is continued until a clear solution is formed. To this solution, cooled to 5° C., is added dropwise, a mixture of 340 parts of acetic acid and 60 parts of propionic acid, while stirring and allowing the temperature to rise to 15° C. The mixture is then cooled to between −2° C. and +2° C., and a solution of 35.6 parts (0.2 mole) of 2-amino-5-methylsulfonylthiazole (J. Org. Chem. 24, 194), in a mixture of 340 parts of acetic acid and 60 parts of propionic acid, is added portionwise, while keeping the temperature at 0° C. to 5° C. The mixture is then stirred at this temperature for two hours. An excess of nitrous acid is maintained during this time and is then removed by the addition of small amounts of urea. This diazo solution is then added during about one half hour to a stirred solution of 48.6 parts (0.2 mole) of [2-(N-ethylanilino)ethyl]trimethylammonium chloride in 100 parts of water, while keeping the temperature at 0° to 2° C. After stirring for one hour at this temperature sodium acetate is added to bring the pH to 4–5 and the agitation is continued at 2° to 5° C. for an additional ten hours. The reaction mixture is then stirred at room temperature for 8 hours. Sodium chloride is added and the red dye, which precipitates, is filtered off, washed with 20% sodium chloride solution and dried. The new dye has the formula

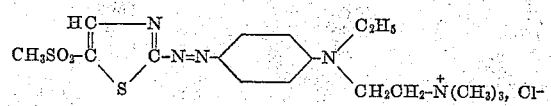

It is a violet-red powder, which dissolves in water to give a red solution. The absorption maximum in ethanol is located at 502 millimicrons. It dyes acid-modified polyacrylic fibers and acid-modified polyester fibers bright red shades of good fastness properties.

When the [2-N-ethylanilino)ethyl]trimethylammonium chloride of this example is replaced with an equivalent amount of [2-(N-ethyl-m-toluidino)ethyl]trimethylammonium chloride, a dye of homologous formula and similar dyeing properties is obtained.

Example 2

A solution of nitrosylsulfuric acid is prepared by adding portionwise 14.5 parts (0.2 mole) of sodium nitrite to 100 parts of sulfuric acid monohydrate. Powdered 2-amino-5-methylsulfonylthiazole (35.6 parts) is then added portionwise at 5° C. and the obtained slurry is stirred at 5° C. for an additional 3 hours. An excess of sodium nitrite is maintained during this time and is then removed by the addition of small amounts of urea. This diazo solution is then added during about one half hour to a stirred solution containing 70.4 parts of [2-(o-chloroanilino)ethyl]diethylmethylammonium methosulfate in 100 parts of water, while keeping the temperature at 0° to 2° C. After stirring one hour at this temperature, sodium acetate is added to reduce the acidity to pH 4, and the agitation is continued at 2° C. to 5° C. for an additional 10 hours.

The obtained dye is then salted out, filtered off, washed with 20% sodium chloride solution and dried. The new dye has the formula:

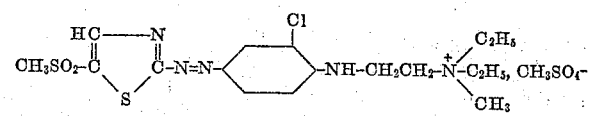

It is a scarlet powder, which is soluble in water, giving a red solution. The absorption maximum in ethanol is located at 488 millimicrons. It dyes acid modified acrylic fibers red-orange shades of good fastness properties.

When the [2-(o-chloroanilino)ethyl]diethylmethylammonium methosulfate of this example is replaced with an equivalent amount of [2-(m-chloroanilino)ethyl]diethylmethylammonium methosulfate, a dye of similar shade and properties is obtained.

Example 3

A diazotized solution of 3.5 parts of 2-amino-5-methylsulfonylthiazole, prepared by the procedure described in Example 1, is added during about one half hour to a stirred solution of 7.2 parts of diethylmethyl[2-(5-methyl-o-anisidino)ethyl]ammonium methosulfate in 10 parts of water, while keeping the temperature at 0° C. to 2° C. The formed dye, isolated as described in Example 1, has the formula

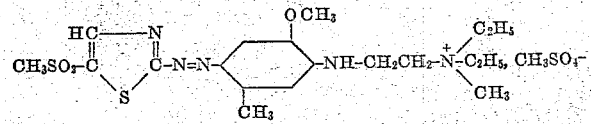

It dyes acid modified acrylic fibers violet-red shades of good fastness properties.

Example 4

By following the procedure of Example 1, and employing the diazo and coupling components shown in the following table, basic red dyes for acid modified acrylic fibers are obtained.

| Diazo Component | Coupling Component |
|---|---|
| (a) 2-amino-5-ethylsulfonyl-thiazole. | [2-(N-methyl-3-ethylanilino)-ethyl]-trimethylammonium chloride. |
| (b) 2-amino-5-n-butylsulfonyl-thiazole. | [2-(N-n-butyl-m-anisidino)-ethyl]tri-ethylammonium chloride. |
| (c) 2-amino-5-n-propylsulfonyl-thiazole. | n-butyldimethyl[2-(N-n-propyl-2,5-dichloroanilino)-ethyl]ammonium chloride. |
| (d) 2-amino-5-methylsulfonyl-thiazole. | [2-(N-2-hydroxyethyl-2-chloro-5-methylanilino)ethyl]-trimethylammonium chloride. |
| (e) 2-amino-5-methylsulfonyl-thiazole. | benzyldimethyl[2-(N-2-cyanoethylanilino)ethyl]ammonium chloride. |
| (f) 2-amino-5-methylsulfonyl-thiazole. | [2-(N-ethyl-2-chloro-5-methoxyanilino)-ethyl]2-hydroxyethyldimethyl-ammonium chloride. |
| (g) 2-amino-5-methylsulfonyl-thiazole. | diethylmethyl[2-(o-anisidino)ethyl]-ammonium methosulfate. |
| (h) 2-amino-5-methylsulfonyl-thiazole. | diethylmethyl[2-(5-chloro-o-anisidino)-ethyl]ammonium methosulfate. |
| (i) 2-amino-5-n-butylsulfonyl-thiazole. | diethylmethyl[2-(2,5-dimethoxy-anilino)ethyl]ammonium methosulfate. |

The 2-amino-5-methylsulfonyl and 5-n-butylsulfonyl-thiazoles and their preparation are described in J. Org. Chem., vol. 24, at pages 193 and 194. The ethylsulfonyl and propylsulfonyl homologs may be prepared by analogous methods.

The coupling components named in the above examples are either known compounds or may be prepared by known methods. For instance, the coupling component first named in Example 1 may be prepared by reacting N-ethyl(N-β-hydroxyethyl)aniline with phosphorus oxychloride to produce the corresponding N-β-chloroethyl compound, and then reacting the latter with trimethylamine to produce the quaternary compound. The component first named in Example 2 may be prepared by alkylating the diamine of formula

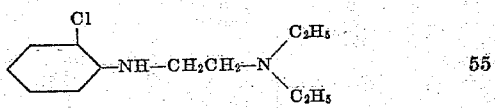

with dimethyl sulfate. The various other coupling components named in the above examples may be prepared by one or the other of the above procedures depending on whether their anionic member is Cl or the methosulfate radical.

The following example will illustrate a practical dyeing procedure for use with my novel colors.

Example 5

100 parts of acid-modified acrylic fiber are prescoured at 160° F. for 15 minutes in 4000 parts of water and 1 part of a non-ionic dispersing agent (for instance, the condensation product of oleyl alcohol with 20 moles of ethylene oxide). The fabric is rinsed and then boiled for 2 hours in a dye bath consisting of 1 part of glacial acetic, 1 part of the dye produced in Example 1, 0.3 part of sodium acetate and 4000 parts of water. The fabric is then rinsed in warm water and scoured as before. Finally, the fabric is rinsed, dried and pressed.

It will be understood that the details of the above examples may be varied widely within the skill of those engaged in this art.

The novel compounds of this invention not only satisfy the above enumerated principal objects of this invention, but I find that they also possess good general fastness qualities (e.g. washing, soaping, etc.) and they exhibit the property of good build-up on tone to provide deep shades of red.

In the claims below, the term "lower alkyl" shall be understood as defining an alkyl radical of 1 to 4 C-atoms.

I claim as my invention:

1. A cationic azo dye of the formula

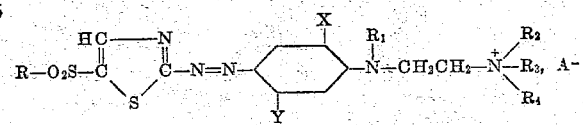

wherein R is an alkyl radical of 1 to 4 C-atoms; X is a member of the group consisting of H, Cl and OCH$_3$; Y is a member of the group consisting of H, Cl, CH$_3$, C$_2$H$_5$ and OCH$_3$; R$_1$ is a member of the group consisting of hydrogen, 2-hydroxyethyl, 2-cyanoethyl and lower alkyl; R$_2$, R$_3$ and R$_4$ are members selected from the group consisting of lower alkyl, benzyl and 2-hydroxyethyl; and A$^-$ is a water-solubilizing anion.

2. The azo dye of formula

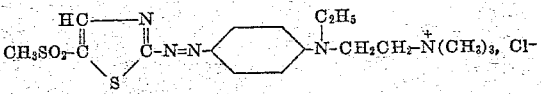

3. The azo dye of formula

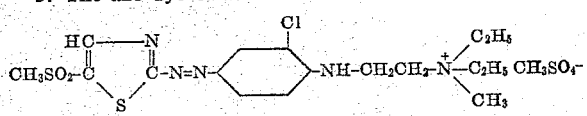

References Cited in the file of this patent
UNITED STATES PATENTS

| 2,864,812 | Bossard et al. | Dec. 16, 1958 |
| 2,889,315 | Bossard et al. | June 2, 1959 |
| 2,893,816 | Tsang et al. | July 7, 1959 |
| 2,972,508 | Kruckenberg et al. | Feb. 21, 1961 |

FOREIGN PATENTS

| 477,913 | Germany | May 30, 1929 |
| 501,623 | Germany | June 19, 1930 |
| 556,218 | Canada | Apr. 22, 1958 |

OTHER REFERENCES

Dickey et al.: "J. Org. Chem.," vol. 24, pp. 187–196, February 1959. (Copy in Patent Office Science Library.)